United States Patent Office 3,721,568
Patented Mar. 20, 1973

3,721,568
METHOD OF TREATING SPENT GRAIN
Jack P. Wilson, Wynnewood, Pa., assignor to Proctor & Schwartz, Inc., Philadelphia, Pa.
No Drawing. Filed July 14, 1970, Ser. No. 56,217
Int. Cl. A23l 1/10
U.S. Cl. 99—80 B                               7 Claims

ABSTRACT OF THE DISCLOSURE

The spent grain coming from a still is spray dried in a conventional spray dryer to arrive at a dried grain product fit for human consumption or substantially mitigate the problems of pollution caused by spent grain constituents.

BACKGROUND OF THE INVENTION

(1) Field of the invention

This invention relates to the field of food grain processing and pollution control and, more particularly, to the treatment of a pollutant by-product of grain distillation to either arrive at a useful end product or mitigate the problems of pollution.

(2) Description of the prior art

The by-product of the distillation of grain mixtures of malt, rye, corn, oats, wheat et cetera has been handled in many ways. The by-product in the form of a liquid discharged from the bottom of the still through a heat exchanger is traditionally known as slop, stillage or spent grain. It contains proteins and vitamins as solubles and as solids of approximately seven percent by volume of the water solvent base. The present invention intends the term spent grain as used hereinafter to include the by-product of breweries in processing beer et cetera.

Certain stills have treated the spent grain by first screening out the larger grain particles and then flowing the remaining liquid into combinations of pools which have been chemically treated for bacterial pollutant control. Thus, by a sequential running of one pool into another with a series of chemical treatments, the final residual pool of treated spent grain would be of sufficient non-pollutant character to be fit for flow into a natural body of water.

Other treatments or non-treatments of spent grain have taken one of three major routes with various combinations of the steps of the major routes as other alternate routes. The first of the three major routes has been to sell the spent grain without treatment directly from the still as animal feed because of its protein and vitamin content. A second route has been to take the spent grain from the still and screen out, rotary press and rotary dry the larger particulate parts in a series of steps with a resultant animal feed end product with the remaining pressed and screened liquid part (carrying the fine particulates and solubles) sold as liquid feed for animals or further processed. A third route, similar to the second, has been to take the spent grain from the still, screen press and dry the screenable particulates and feed the remaining screened and pressed liquid through a condensor and/or evaporator concentrating it and then finally drying the concentrate to a dry powder and selling the latter as an animal feed. The evaporated and/or concentrated liquid may be fed back as a concentrate into the wet, larger grain particles and drum dried with it at the same time as a mixture. Since the number of combinations of the steps of each of the major routes is large, it should be recognized that a common element of each of these routes has been to utilize the product or its end product as animal feed. This end product use of the distillery by-product has been common mainly because the nature of the mechanical and high temperature drying steps of treatment of the spent grain has so mutated the character of the proteins and vitamins in the spent grain as to render it not of sufficient quality for human consumption.

Spray drying techniques are generally known to be available to any liquid which can be pumped. However, these techniques have not been utilized at very low volume concentrations of solids (as spent grain is), and, therefore, the application of spray drying techniques to pollution control and, particularly, to the pollutants of spent grain are unknown.

SUMMARY OF THE INVENTION

This invention is directed toward a method of treating spent grain, toward the control of pollution and toward a grain end product fit for human consumption. The size of the grain particles fed through the spray dryer must be sufficiently small to be acceptable to the various spray drying atomizers such as pressure nozzles, and proper sizing of the particles, if not originally present, may be obtained by mashing, milling or grinding of the original grain mixture prior to fermentation and distillation or the mashing, milling or grinding of the spent grain particulates subsequent to distillation.

Spray drying of the spent grain has been found to preclude deleterious constituent change of the grain with respect to its protein and vitamin content on the one hand and mitigate the prior by-product pollution problem on the other hand because not all pollutants were removed from the water base of the spent grain prior to discharge into a natural waterway. The objects, features and advantages of the present invention will become more apparent when reading the following disclosure and claims.

DESCRIPTION OF THE PREFERRED EMBODIMENT

Spent grain has not only created pollution problems but its treatment has resulted in structural modification of the solubles and grain particles entrained therein with a resultant mutation of the protein and vitamin content thereof. Thus, the end product of the prior art treatments of spent grain has been considered acceptable only for animal feed.

Basic spray drying is a technique for producing a dried product through the atomization of pumpable fluids or slurries containing the product into a high temperature gas stream. In a very short period of time, measured in seconds, the base moisture, either as a solvent or carrier, is removed in vapor form because the high temperature gas stream supplies the necessary heat of evaporation to the atomized fluid or slurry. The spray drying system utilized within the scope of the present invention is of conventional construction and comprises a spray dryer, a product collector such as a cylcone or bag collector and/or wet scrubbers, and dried product conveyor means, preferably of the pneumatic type, by which dried product from the product collector (which has separated the dried product from the vapor and high temperature gas) is transferred to a storage area. The vapor laden gas is then either exhausted to atmosphere in full or partially or fully tapped for its thermal and/or vapor value.

The principles of spray drying may be applied to any material that can be pumped. In use of certain atomization techniques such as pressure nozzles, the in-feeds to the spray dryer may need to be milled or ground. The basic reason for use of spray drying (especially of the co-current type) in the past has been because of the heat sensitiveness of the spray dried material, but the heat economy of spray drying has been considered inferior for very low solid concentration materials (by volume), and, thus, spray drying techniques have not been applied to spent grain. As a result, substantial amounts of solvents are disposed of along with solubles and certain very finely sized solids directly into natural bodies of water, and the problems of pollution have become very apparent because of the germination of bacteria in areas where these solubles and solids have concentrated. It has been found that the spray drying of spent grain is capable of an extremely pure removal of solids and solubles from the in-feed, thus exhausting to nature only a substantially pure residuary of liquids and/or gases.

Spray drying of spent grain has resulted in a more useful grain end product through its ability to maintain the quality of the protein and vitamin content in the in-feed. Thus, the initial grain input of either wheat, rye, oat, corn, et cetera or combinations thereof into conventional fermentation and distillation processes has resulted in entrained grain solids and solubles of different constituency than the initial grain input, and the spray drying of the spent grain byproduct having these entrained solids and solubles has resulted in an entirely new grain product fit for human consumption.

This is understood to result from the elimination by spray drying of mechanical procedures such as screening, pressing, concentrating, evaporating, rolling and/or centrifuging and the high temperature drying previously utilized. Since the solids and solubles carried by the spent grain from the still are heat sensitive (excess heat causes mutation of the protein and vitamin constituents therein), co-current flow spray drying (which permits a shorter contact time in the high temperature area of the drying chamber when wet and a longer contact time when dry in the lower temperature area of the dryer) is recommended for the production of grain fit for human consumption from spent grain.

An example of the use of spray drying to arrive at a new grain product and also for pollution control is set forth hereinafter. A ten foot diameter, co-current flow, spray dryer employing a disc atomizer may be fed spent grain containing approximately seven percent solids by volume carried by a water base. The spent grain is fed to the disc atomizer of the dryer by a Moyno pump which delivers the spent grain at approximately ten pounds per square inch pressure with approximately one-third horsepower. The inlet temperature at the dryer is between 360° and 430° F. and the outlet temperature is between 155° and 205° F. By utilizing these specifications and equipment, a grain product is segregated from the water base and with a moisture content by volume between 2 and 5.2 percent. This new grain product is beyond physical or chemical definition aside from its grain character analogous to the initial grain input into the fermentation and distillation processes.

The new use of spray drying for pollution control is most important in those areas where a water base liquid containing pollutant solids and/or solubles of low volume concentration not intended for further beneficial use has been disposed of by its mere flow into natural bodies of water. Thus, the present invention provides a new way of separating the pollutant solids and solubles, if any, from a liquid such as water so that the water in substantially pure form may be emptied into our natural water ways and the separated pollutant solids and solubles may be disposed of in numerous ways, e.g., by incineration or burying.

Since the vapor laden gas exhausted from the product collector is at a higher temperature than ambient, certain possibilities exist with respect to its heat and condensate value. Thus, through a heat exchange process, the high temperature vapor laden gas may be used in part to heat production facilities et cetera and the condensate, substantially pure water, may be emptied into natural bodies of water.

What I claim is:

1. A method of treating spent grain which contains water and particulate matter to produce an end product fit for human consumption consisting essentially in the steps of mechanically reducing the water content of said spent grain by spray drying said spent grain in a spray dryer, utilizing co-current flow in said spray dryer and collecting the dried particulate matter.

2. The method set forth in claim 1 further comprising the step of grinding the particulate matter of the spent grain prior to feeding said spent grain into said spray dryer.

3. The method set forth in claim 1 wherein the step of spray drying includes disc atomizing the spent grain.

4. The method set forth in claim 2 wherein the step of spray drying includes pressure nozzle atomizing the spent grain.

5. The method set forth in claim 1 further comprising the step of exhausting said water solely to atmosphere in vapor form.

6. A method of treating spent grain using a spray dryer wherein said spent grain contains water having a first end disposition and grain pollutant matter having a second end disposition consisting essentially in the steps of mechanically reducing the water content of said spent grain by spray drying said spent grain in said spray dryer, utilizing co-current flow in said spray dryer, collecting said grain pollutant matter separate from said water, disposing of said water by said first end disposition and disposing of said grain pollutant matter by said second end disposition.

7. The method set forth in claim 6 wherein said first end disposition includes exhausting said water solely in vapor form to the atmosphere.

References Cited

UNITED STATES PATENTS 2,096,103   10/1937   Grelck _____ 99—5

RAYMOND N. JONES, Primary Examiner

U.S. Cl. X.R.

99—199, 5